Figure 1:
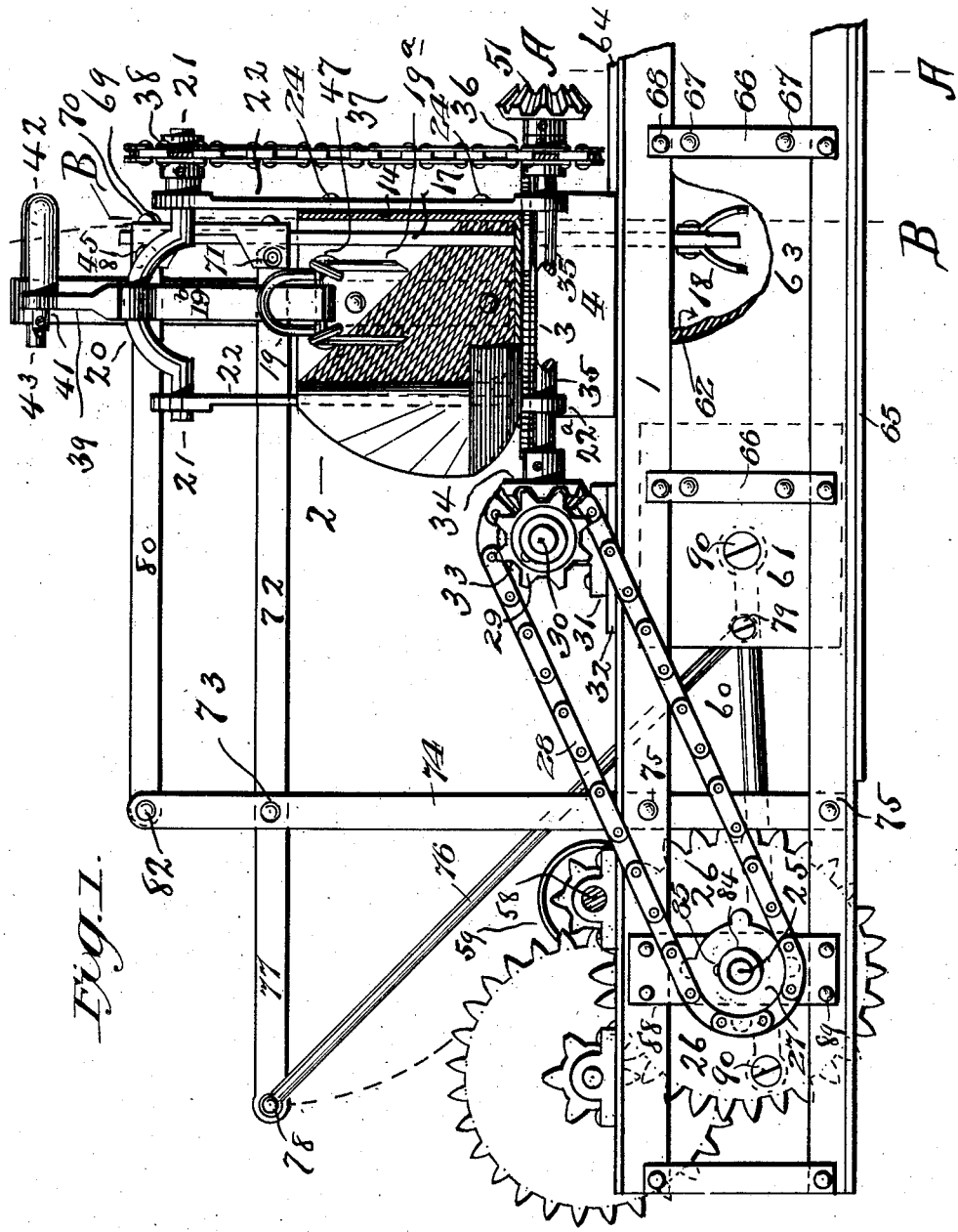

G. A. RYERSON.
REVERSIBLE FEED HOPPER FOR BALING PRESSES.
APPLICATION FILED JAN. 24, 1911.

1,021,730.

Patented Mar. 26, 1912.

3 SHEETS—SHEET 1.

WITNESSES:
Florence E. Tuttle
Carl J. Heffner

George A Ryerson INVENTOR
BY
Frank J. Tuttle
ATTORNEY

COLUMBIA PLANOGRAPH CO., WASHINGTON, D. C.

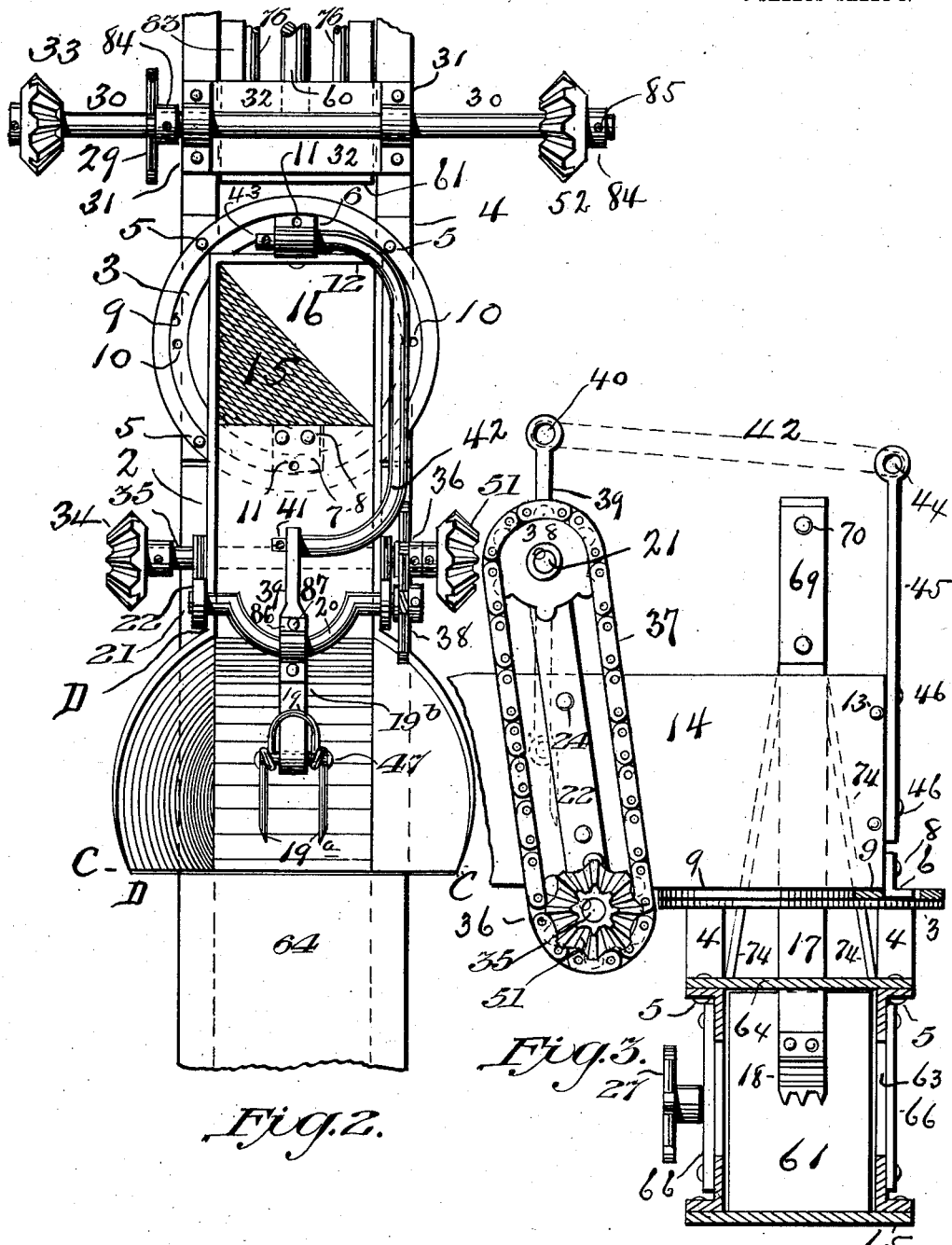

G. A. RYERSON.
REVERSIBLE FEED HOPPER FOR BALING PRESSES.
APPLICATION FILED JAN. 24, 1911.
1,021,730.
Patented Mar. 26, 1912.
3 SHEETS—SHEET 3.
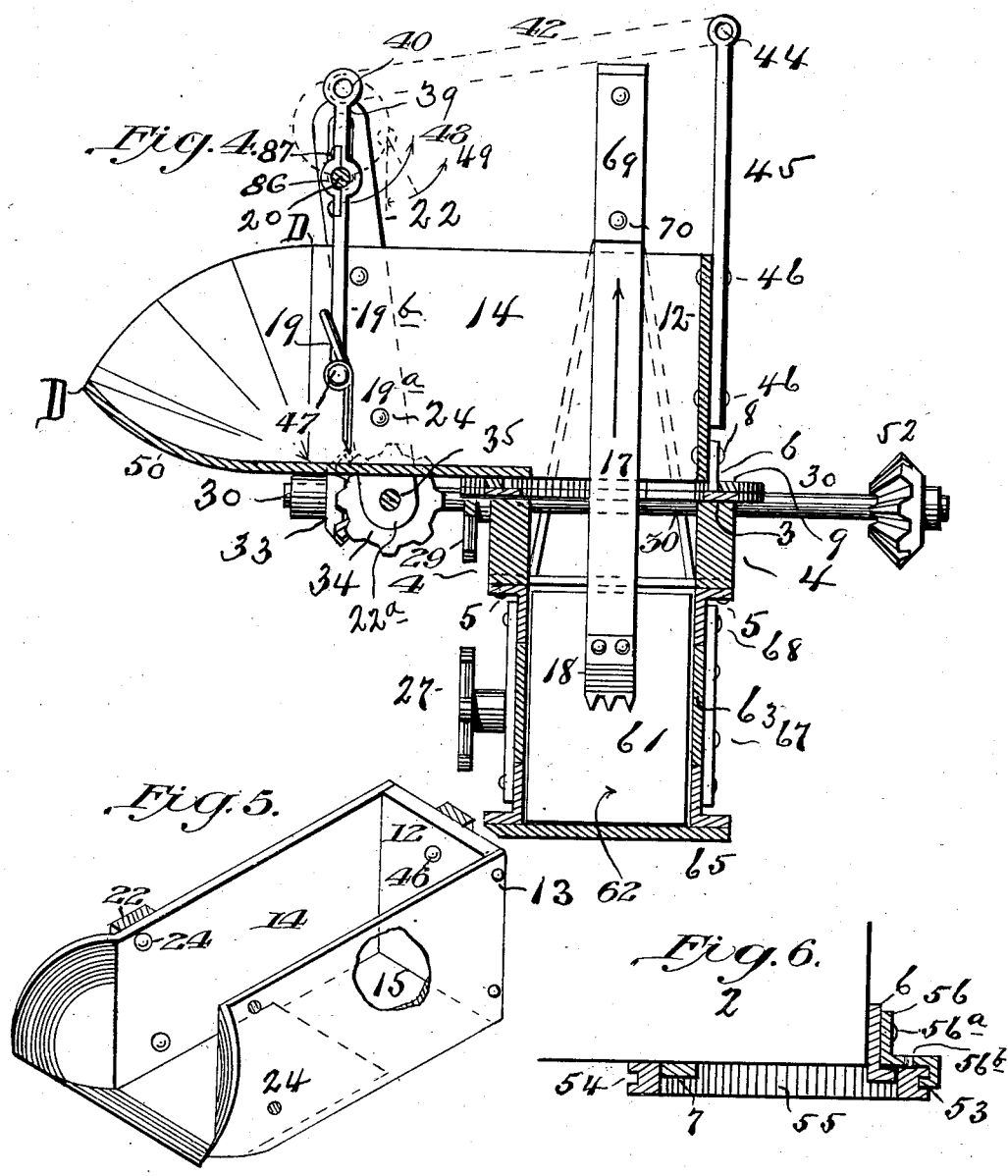

UNITED STATES PATENT OFFICE.

GEORGE A. RYERSON, OF BELLEVUE, OHIO, ASSIGNOR OF ONE-HALF TO CORNELIUS R. CALLAGHAN, OF BELLEVUE, OHIO.

REVERSIBLE FEED-HOPPER FOR BALING-PRESSES.

1,021,730.  Specification of Letters Patent.  Patented Mar. 26, 1912.

Application filed January 24, 1911. Serial No. 604,296.

*To all whom it may concern:*

Be it known that I, GEORGE A. RYERSON, citizen of the United States, residing at Bellevue, in the county of Sandusky and State of Ohio, have invented certain new and useful Improvements in Reversible Feed-Hoppers for Baling-Presses, of which the following is a specification.

My invention relates to that class of baling presses which is chiefly used for the baling of hay and straw, and its principal purpose and object is to provide an improved feeder for the same; together with a combined feed carrier and feed hopper, which is mounted upon and so secured to the frame work, as to be reversible, or turnable about a center as upon a pivot, in order better to accommodate the varying conditions of receiving from either side of the machine; and wherein the feed hopper is so shaped or formed that the charge of material to be baled is considerably reduced or condensed in volume, before it is brought under the downward action of the feeder.

Referring now to the drawings herein: Figure 1 represents a partial side elevation of an ordinary baling press of the belt driven sort; to which my invention is attached. Fig. 2 represents a top plan view of my invention; the hopper being turned about its pivot to traveling position. Fig. 3 represents a vertical cross section of Fig. 1 on the line A A, some of the parts being omitted, and a portion of the hopper being broken away. Fig. 4 represents a cross section of Fig. 1 on the line B B looking toward the left, some of the parts being omitted. Fig. 5 represents a perspective view of the feed hopper. Fig. 6 represents the details of a modification.

Coming now to a more detailed description of my invention: On top of the frame work 1, as heretofore stated, is mounted a feed hopper 2 which is made to rest upon a circular track 3 which is supported by a suitable blocking 4 and to which blocking said track is secured as by bolts 5, which, passing through said blocks, are made to secure the same to the frame work. In order that said hopper may be made reversible for the purpose stated, I attach thereto suitable guide pieces 6 and 7 which are located diametral of said track, and which are secured to said hopper by suitable means 8. Said track, as represented in the drawings Figs. 1, 2, 3 and 4, is made of two plates, upper and lower, the upper one of which is given a larger internal diameter than the lower, thus forming a flange 9, against the inner perimeter of which said guide pieces are made to operate, and thus holding said hopper central with said track; while said hopper, at one end, is supported by means of said guide piece 6 being made to ride upon said lower plate, oppositely it is supported by riding upon said flange.

It may now be noticed that naturally there is more weight in the hopper upon one side of the center, causing it to tip in that direction; and to overcome this, during the reversing or shifting process, I intend that the end wall 12, hereafter referred to, shall be made heavy. It should now be understood that I make said track flanged, and with upper and lower plate, from choice, and not from necessity, as will subsequently appear. In order to secure said hopper in place when in use, said track is provided with suitable apertures 10; and to register therewith suitable apertures 11 are made in said guide pieces, through which a bolt may be made to pass. It may now be noticed that since the guide piece 7 is secured to the under side of the hopper, the aperture 11 therein, is necessarily carried up through the bottom of said hopper.

In construction said hopper is die formed or struck up, the rear end being closed by a separate wall 12, by means 13 which pass through the sides 14. For manifest reasons said hopper is provided with an opening or feed hole 15, which is made to register with the feed pit 16 of the baler, when in place; and for that purpose, said hopper is so set or mounted, that the inner surface of said wall 12 is made to register with one of the walls of said feed pit, and to constitute the limit of said opening in that direction; while oppositely it is limited by the opposite wall of said pit.

The use of automatic feeders in machines of this sort is very old in the art. Such a feeder 17 is shown in the drawings; the foot thereof being provided with the usual feeder plates 18. From what has already been said, it is now understood that said hopper is made to receive the charge which is to be fed to the baler; and in order that said charge may be carried to the feeder, and placed under its downward action, I provide said hopper with an oscillatable fork 19 with tines 19ª, which has a handle 19ᵇ, pivotally carried by the crank-pin 20 of the cranked shaft 21 which is given bearings in the upper end of standards 22, secured to the side walls 14 of said hopper by suitable means 24. In order that motion may be communicated to said shaft, I mount upon the extended end 25 of the gudgeon of one of the twin wheels 26, which is common to belt driven machines of this sort, a sprocket wheel 27 which is connected by chain 28 to a similar wheel 29, which is carried upon a shaft 30 journaled in a pillow block 31, which is mounted upon a plate 32 which is secured to the upper side of the frame work; and, the outer end of said shaft 30 I provide with a bevel gear wheel 33, which is made to mesh with a companion gear wheel 34 which is carried by a shaft 35 which is journaled in the depending ends 22ª of said standard 22. Near the opposite end of said shaft 35 I mount thereon a sprocket wheel 36, and connect the same by chain 37 to a similar wheel 38, which is mounted upon the projected end of said shaft 21. And thus as said twin wheel is made to operate, said shaft 21 is turned. In order now that said fork may be suitably operated, the upper or projected end of the handle, 39, is provided with a pivot hole 40 in which is pivoted one end 41 of an oscillating connecting rod 42, the opposite end 43 of which is pivoted in a pivot hole 44 in the upper end of a rigid standard 45, which is secured to the rear side of the wall 12 by suitable means 46. For manifest reasons, and especially because the charge carried by said fork 19 is of necessity brought under the downward action of said feeder 17, I make said tines of suitable spring, or yielding material, and make the same to be carried by a pivot bolt 47, about which the same is coiled to form a spring, the opposite end being formed so as to engage the fork handle. From preference I make the shank and tines of said fork, from a single section of suitable spring material; which, after being coiled about said bolt, is looped behind said handle in a manner to complete said spring. Coming to consider the relative proportions which must be given to the various parts in order that said fork shall perform its appointed functions, it must be manifest that whatever position is given to the shaft 21, the fork tines must suitably clear the bottom of said hopper, when the fork hangs vertical, and the crank-pin 20 is in its lowest position. Also whatever may be the position of said shaft in height above the bottom of said hopper, it is further manifest that due regard must be had for the plane, or path, within which said feeder operates; so as to avoid any unreasonable encroachment thereon, and consequent strain upon said tines. In practice I find that this position is best determined when said crank is turned in the direction of the arrow 48, Fig. 4, practically 65° (sixty-five degrees) from vertical; at which point said fork should be given a position which is practically 36° (thirty-six degrees) from vertical, in the direction of the arrow 49. Assuming that the mechanic has already determined upon the radius of the crank movement, and the consequent fork radius, and that he has already determined what amount thereof to allow (if any) for an encroachment upon the path of the feeder, it is plain that it now becomes but a mere matter of triangulation, to determine the position of said shaft. To accommodate this position it is manifest that the length of rod 42 and the upward extension 39 of the fork handle 19ᵇ must be accordingly. In practice I make said crank radius to have a given ratio to said upward extension, which is, as 13 to 18; and having first set said shaft, I then give to said rod 42 such length as the conditions require in order to make suitable connection with the standard 45. It should now be understood that I do not give this formulæ, as an invariable one, from which no variation is to be allowed; but I give the same as one from which satisfactory results are obtained. Relative to the amount of allowance for encroachment upon the path of said feeder, heretofore mentioned, it should now be understood that this is a matter wholly discretionary with the mechanic; since, as I construct my machine, said fork makes the greatest advance toward said feeder when held at the angle mentioned. Preferably I make it encroach substantially one half of the length of the tine. In order that said hopper shall have suitable shape, to enable it to receive and hold a charge of material to be baled, while the fork is being operated to carry a charge to the feeder, and also to cause said charge to be suitably condensed while in transit to the feeder, I first fold up the sides 14, and then for a portion of its length, such as may be sufficient for the amount of condensation desired, and to give the desired room for said charge, I form up the bottom of said hopper, as shown in section at 50, Fig. 4, the curve being limited only, by not interfering with the operation of said fork. And in addition thereto I so form the surplus stock as to give an increased width of bottom on line C C of Fig. 2, while the balance of the surplus is concaved outwardly, the greatest length being along the line D D.

It has already been explained and is now understood how action is transmitted to the fork 19, when the hopper is in the position shown in Figs. 1, 3 and 4; and it is also now understood how said hopper may be reversed in position, or made to turn as upon a pivot, and made to receive from the opposite side of the baler; without being removed or detached therefrom. In order now that said fork may be given suitable action when said hopper is reversed, I extend the shaft 35 sufficiently beyond the wheel 36, and mount upon the end thereof a bevel gear wheel 51, see Figs. 2 and 3; and likewise upon the corresponding end of the shaft 30, which is extended for that purpose, I mount a companion meshing gear 52; each of which are suitably set with reference to the center about which said hopper is made to turn, so that upon reversing said hopper they are brought into mesh.

In order to give the fork action in the required direction, it will be observed that I set the gear 33 so that its apex points inward, and thus make it to engage the gear 34 upon the side which is apparently opposite, as seen in Fig. 2. And in consequence, in order to maintain the same action of the fork, when the hopper is in the reversed position, the gear 52 is reversed in direction relative to the gear 33, and therefore its apex is also made to point inward. I am aware that other means may be used to obtain the required action of said fork, which would be consistent with reversing the direction of both said gears 33 and 52, and shortening the shaft 30; but I prefer the method shown.

It has already been stated that I make the track 3 with upper and lower plates, from choice and not from necessity. If preferred said track may be made solid, and without flange, as shown in Fig. 6; and in lieu of making the end wall 12 "heavy," for counter balancing purposes, the rear end of said hopper may be held down by a finger 53, hereafter mentioned, made to reach over and engage the annular groove 54 formed or cut in said track. In this modification it should be observed that the footed guide 6, and the guide piece 7, both engage the inner perimeter of the track 55, similarly as in case of Fig. 2; but that for purpose of furnishing support to said hopper at its rear end, I provide the flanged or footed plate 56 which is secured thereto by means 56ᵃ and make this to ride upon said track, and to secure the same in place I provide a hole 56ᵇ, similarly as in case of the hole 11 in said guide 6; and at its outer end I provide it with the finger 53 previously mentioned.

Referring to Fig. 1, which shows in side elevation a partial view of an ordinary belt driven press, it may now be understood that, for better showing, the usual balance or fly wheel has been cut away from its shaft 58 which is driven by the belt pulley 59; and, that the power thereof is transmitted through the usual gearing to the twin wheels 26, which are connected by the pitman 60 to the plunger 61, which operates within the baling chamber 62, and which is closed by side plates 63, and top and bottom plates 64 and 65. Said side plates, as will be readily understood, are held in place by suitable bars 66, which are secured thereto by means 67, and which in turn are made fast to the frame work by means 68. The upwardly extended end of said feeder 17 is provided with a flanged or channeled connecting plate 69, which is secured thereto by any suitable means 70; and by means of which, and a pivot bolt 71 which passes therethrough, the same is pivotally carried at one end of a beam lever 72, which is fulcrumed by pivot bolt 73 between standards 74, which are secured to the framework by suitable means 75; and the same is operated by means of a connecting rod 76, which connects the short arm 77 of said lever with the rear end of said plunger, by suitable pivotal means 78 and 79, by which means it may now be understood that said feeder is lifted from the baling chamber—or more precisely the feed pit, as this part of the baling chamber is called—when said plunger is made to operate; and that by a reverse movement of said plunger, said feeder is made to operate. In order that said feeder may be held in its appropriate vertical position, the same is given a parallel motion in the usual manner; and for this purpose a parallel bar 80 is pivoted at one end by pivot bolt 81 to the upper end of said channeled connecting plate 69; and oppositely to the upper ends of said standards 74 by means of the pivot bolt 82; said standards being suitably extended for the purpose. For the better operation of my device I provide said rods 76 in pairs, and pivot the lower ends thereof, severally, to one of the arms 83 with which said plunger is provided, and between which said pitman is made to operate.

The mechanic will readily understand that the parts must be so timed, that with a single revolution of the twin wheels 26, the fork and the foot of the feeder, must be brought into coöperative relation, such that the fork will be made to reach its maximum limit of movement toward the feeder, slightly in advance of the foot of the feeder reaching that point. To better accomplish this result I make all the several sprocket wheels of uniform size. Each of said wheels, as well as the bevel gears are provided with suitable hubs 84, and the same are secured to their respective shafts by a pin 85. A suitable boxing 86 secured by means 87 to the fork handle is made to furnish a bearing for the crank-pin 20. The gudgeon 25 is made to have a bearing in, or upon, a plate 88, secured to the frame work by suitable means 89. 90 represents suitable pivotal means, by which the pitman 60 is connected respectively to the twin wheels 26, and plunger 61. In Figs. 3 and 4, it will be observed that the connecting rod 42 is omitted, and shown in dotted outline only. This is for better illustration of the means of pivoting the same to the upper end of the fork handle upon the one hand, and to the standard 45 upon the other. On reference to said figures it will be observed that I make the standard 45 of such height that the pivot hole 44, is midway between the highest and lowest position of the pivot hole 40. I do this from preference, in order to obtain a more desirable action of said fork.

Having fully described my invention what I now claim as new is:

1. In a device of the character described, the combination of a frame work therefor; a transversely extending shaft with bearings therefor, a sprocket wheel, mounted thereon near one of its ends; a pitman-operating gear wheel provided with an extended gudgeon, a second sprocket wheel mounted thereon, a connecting chain between said sprocket wheels; a feed hopper, with feed hole therein, mounted upon and secured to said frame work, a shaft therefor, extending transversely of the same, and bearings whereby the same is carried; a pair of meshing bevel gears, one for each shaft, such that as said chain is operated, said second or last mentioned shaft is made to operate; a third sprocket wheel mounted upon and near the opposite end of said second shaft; a cranked shaft, with crank pin and bearings therefor, a fourth sprocket wheel mounted upon one end thereof, and a second connecting chain between said sprocket wheels; an oscillating fork having a handle pivotal means by which the same is carried intermediate of the ends of the handle thereof, by the crank-pin of said crank; a rigid standard, rising from said hopper, and a pivotally connected oscillating connecting rod made to connect the upper end of said standard with the outer end of said fork handle; whereby as said gear wheel is made to operate said fork is made to operate.

2. In a device of the character described, the combination of a frame work; a transversely extending shaft bearings therefor, and a sprocket wheel mounted thereon near one of its ends; a pitman-operating gear wheel provided with an extended gudgeon, a second sprocket wheel mounted thereon, and a connecting chain between said sprocket wheels; a circular track, mounted upon and carried by said frame work; a rotatable feed hopper, with feed hole therein, mounted upon said track, and suitable guiding means therefor which are carried thereby and made to engage one of the perimeters of said track, together with suitable retaining or holding means, whereby said hopper is made to turn upon said track as upon a pivot, and to be held in position as and when desired; a shaft therefor extending transversely of the same and bearings whereby the same is carried; two several pair of meshing bevel gears, one for each of the ends of said shafts, said gears being so set that as said hopper shall be turned about its axis, the appropriate pair of said gears will be brought into mesh, and said second shaft when operated will be given its appropriate action; a third sprocket wheel carried by said second shaft, near one of its ends; a cranked shaft with crank-pin and bearings therefor, a fourth sprocket wheel mounted upon one end thereof, and a connecting chain between said last mentioned sprocket wheels; an oscillating fork having a handle, and pivotal means by which the same is carried intermediately of the ends of the handle thereof, by the crank-pin of said crank; a rigid standard, rising from said hopper, and a pivotally connected oscillating connecting rod, made to connect the outer end of said fork handle, with the upper end of said standard; whereby as said gear wheel is made to operate, said fork is made to operate, whenever either pair of said bevel gears is in mesh.

3. In a device of the character described, the combination of a frame work; a transversely extending shaft with bearings therefor mounted thereon, and means for the operation thereof; a circular track mounted upon said frame work, a rotatable feed hopper with feed hole therein mounted upon said track, and suitable guiding means therefor carried thereby and made to engage one of the perimeters of said track; suitable retaining or holding means, whereby said hopper when rotated is made to turn upon said track as upon a pivot, and to be held in operative position, as and when desired; a shaft therefor extending transversely of the same and bearings whereby said shaft is carried; two several pairs of meshing bevel gears, one for each of the ends of said shafts, said gears being so set that as said hopper shall be turned about its axis, the appropriate pair of said gears will be brought into mesh, and said second shaft will, when operated, be given its appropriate action; a sprocket wheel carried by said last mentioned or second shaft, near one of its ends; a cranked shaft, with crank-pin and bearings therefor; a second sprocket wheel mounted upon one end thereof and a connecting chain between said sprocket wheels; an oscillating fork having a handle; pivotal means by which the same is carried intermediate of the ends of the handle thereof by the crank-pin of said crank; a rigid standard rising from said hopper, and a pivotally connected oscillating connecting rod, made to connect the outer end of said fork handle, with the upper end of said standard; whereby as said first mentioned shaft is made to operate, said fork is made to operate, whenever either pair of said gears is in mesh.

4. In a device of the character described, the combination of a frame work; a circular track mounted thereon, a rotatable feed hopper with feed hole therein mounted upon said track, and suitable guiding means therefor which are carried thereby and made to engage one of the perimeters of said track; suitable retaining or holding means, whereby said hopper when rotated is made to turn upon said track as upon a pivot, and to be held in operative position as and when desired; a shaft therefor extending transversely of the same, and bearings whereby the same is carried; a driving sprocket wheel mounted thereon near one of its ends; a cranked shaft, with crank-pin and bearings therefor; a second sprocket wheel mounted upon one end thereof, and a connecting chain between said sprocket wheels; an oscillating fork having a handle, and pivotal means by which the same is carried intermediately of the ends of said handle by the crank-pin of said crank; a rigid standard rising from said hopper, and a pivotally connected oscillating connecting rod made to connect the outer end of said fork handle with the upper end of said standard; together with several means for the operation of said first mentioned shaft thereby causing said fork to operate, as and when said hopper is placed in operative position upon either side of said device.

5. In a device of the character described, a specially formed condensing feed hopper, wherein the one end thereof is closed by a separate plate secured between the folded up sides thereof, and the opposite end thereof is partially closed by a suitable curve which is given to the bottom line; and wherein surplus material, thus created, is given in part to widening said bottom, and in part to concaving said sides, whereby said end is made condensing; and wherein the bottom thereof is cut away to form a feed hole; all substantially as described.

In testimony whereof I affix my signature in presence of two witnesses.

GEORGE A. RYERSON.

Witnesses:
FRANK J. TUTTLE,
CARL J. HEFFNER.

---

Copies of this patent may be obtained for five cents each, by addressing the "Commissioner of Patents. Washington, D. C."